(12) United States Patent
Chen (10) Patent No.: US 7,175,331 B2
(45) Date of Patent: Feb. 13, 2007

(54) BACKLIGHT MODULE WITH TWO TRANSLUCENT FACES

(76) Inventor: Yi-Ting Chen, 8F-2, No. 492, Sec. 1, Wan-Sou Rd., Kweishan Hsiang, Tao Yuan Hsien (TW)

( * ) Notice: Subject to any disclaimer, the term of this patent is extended or adjusted under 35 U.S.C. 154(b) by 218 days.

(21) Appl. No.: 10/796,085

(22) Filed: Mar. 10, 2004

(65) Prior Publication Data

US 2005/0201119 A1    Sep. 15, 2005

(51) Int. Cl.
  *F21V 8/00* (2006.01)
(52) U.S. Cl. .................. 362/615; 362/600; 362/98; 362/216; 362/27
(58) Field of Classification Search ............ 362/600, 362/98, 216, 27, 26, 615
  See application file for complete search history.

(56) References Cited

U.S. PATENT DOCUMENTS 5,764,493 A * 6/1998 Liao ........................ 362/602
6,280,048 B1 * 8/2001 Luquire ...................... 362/125
6,494,586 B1 * 12/2002 Huang et al. ................. 362/27
6,513,942 B2 * 2/2003 Ludwig et al. ............. 362/615

* cited by examiner

*Primary Examiner*—Sandra O'Shea
*Assistant Examiner*—Anabel Ton
(74) *Attorney, Agent, or Firm*—Rosenberg, Klein & Lee (57) ABSTRACT

A backlight module with two translucent faces applicable to operations of scanner is used for scanning of transparent documents. The backlight module has a shell and a light source unit disposed in the shell. The shell has a first translucent portion and a second translucent portion corresponding to each other. The light source unit in the shell can emit light via the first translucent portion and the second translucent portion. When the backlight module is used for scanning of a transparent document and the transparent document is placed outside the first translucent portion, the user can preview the content of the transparent document before scanning via the second translucent portion.

21 Claims, 14 Drawing Sheets

BACKLIGHT MODULE WITH TWO TRANSLUCENT FACES

FIELD OF THE INVENTION

The present invention relates to a backlight module and, more particularly, to a backlight module having two translucent faces, which is used for operations of scanner.

BACKGROUND OF THE INVENTION

In addition to scanning common reflection documents (i.e., opaque documents), a scanner can also scan transparent documents. A transparent document is a slide (also called positive) or a negative. When a scanner is used to scan a transparent document, a backlight module is required to provide backlight illumination so that the scanner can acquire image data when scanning the transparent document.

Further, because the transparent document is made of transparent material, if a user wants to view the image or text content of the transparent document before scanning, an extra illumination light is required. For instance, he can put the transparent document under a light to view its content. However, this way of viewing the content of the transparent document is inconvenient because it is necessary to find another illumination light.

Accordingly, the present invention aims to propose a backlight module used as a light source for preview of a transparent document to solve the problems in the prior art.

SUMMARY OF THE INVENTION

The primary object of the present invention is to provide a backlight module with two translucent faces for providing both a backlight source for scanning a transparent document and an illumination light for preview of the transparent document.

To achieve the above object, the present invention provides a backlight module with two translucent faces applicable to a scanner for scanning of a transparent document. The backlight module comprises a shell having a first translucent portion and a second translucent portion and a light source unit disposed in the shell. The light source unit comprises at least a lamp tube and a light guide plate for uniformly guiding light of the lamp tube to penetrate the first and second translucent portions.

The above backlight module with two translucent faces further comprises a diffuser, which is arranged above the light guide plate and used to diffuse uniformly the output light of the light guide plate.

The above backlight module with two translucent faces further comprises a transflective panel, which is arranged below the light guide plate and used to reflect the output light of the light guide plate to the first translucent portion and transmit the output light of the light guide plate to the second translucent portion.

To achieve the above object, the present invention also provides a backlight module with two translucent faces applicable to a scanner for scanning of a transparent document. The backlight module comprises a shell having a first translucent portion and a second translucent portion and a light source unit disposed in the shell. The light source unit comprises a first lamp tube, a first light guide plate, a second lamp tube, a second light guide plate, and a reflecting plate. The first light guide plate is used for uniformly guiding light of the first lamp tube to the first translucent portion. The second light guide plate is used for uniformly guiding light of the second lamp tube to the second translucent portion. The reflecting plate is arranged between the first and second light guide plates and used to reflect the output light of the first light guide plate to the first translucent portion and reflect the output light of the second light guide plate to the second translucent portion.

The above light source unit further comprises a first diffuser, which is arranged above the first light guide plate and used to diffuse uniformly the output light of the first light guide plate.

The above light source unit further comprises a second diffuser, which is arranged above the second light guide plate and used to diffuse uniformly the output light of the second light guide plate.

To achieve the above object, the present invention also provides a light source unit used in a backlight module applicable to a scanner for scanning of a transparent document. The light source unit comprises at least a lamp tube, a light guide plate for uniformly guiding light of the lamp tube, and a transflective panel arranged below the light guide plate and used to reflect and transmit the output light of the light guide plate.

To achieve the above object, the present invention also provides a light source unit used in a backlight module applicable to a scanner for scanning of a transparent document. The light source unit comprises a first lamp tube, a first light guide plate, a second lamp tube, a second light guide plate, and a reflecting plate. The first light guide plate is used for uniformly guiding light of the first lamp tube. The second light guide plate is used for uniformly guiding light of the second lamp tube. The reflecting plate is arranged between the first and second light guide plates, and is used to reflect the output lights of the first light guide plate and the second light guide plate.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

The present invention provides a backlight module applicable to a scanner for scanning of a transparent document. In order to preview quickly a transparent document before scanning, the backlight module of the present invention has two luminous faces. The transparent document here is a slide or a negative.

Figure 1:
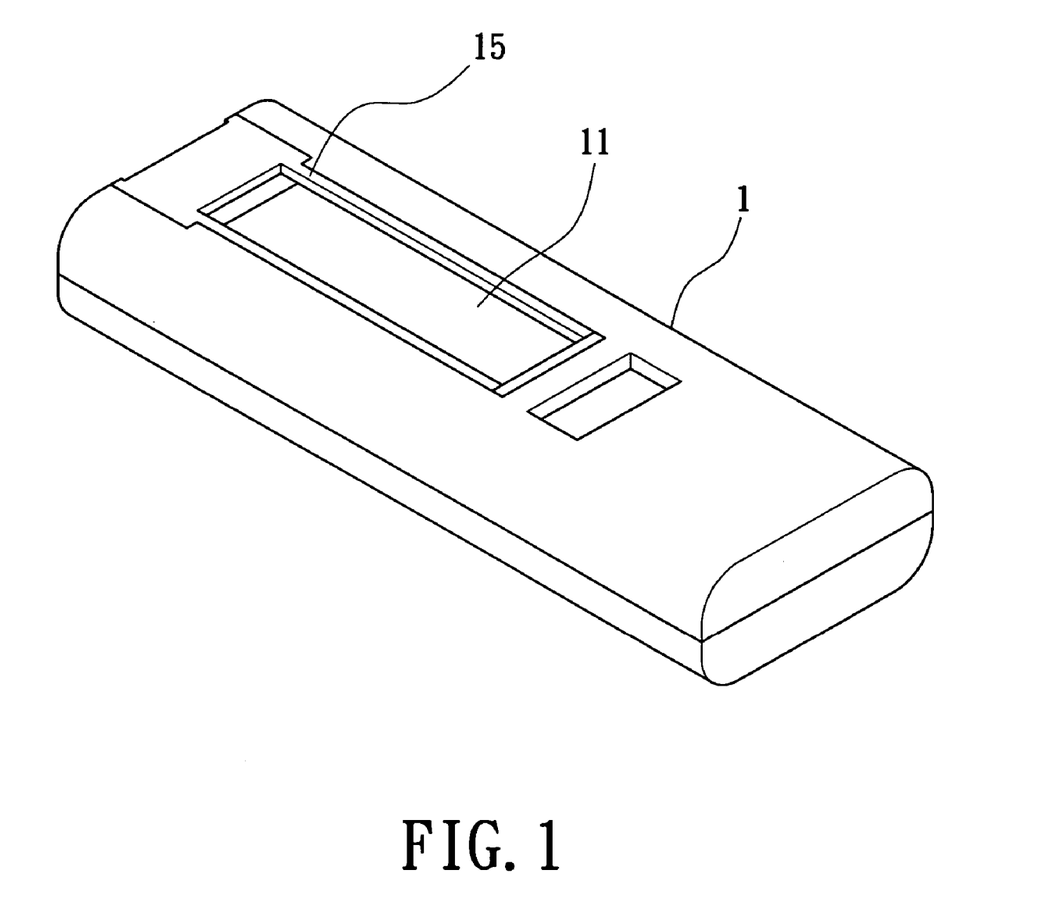
FIG. 1 is a perspective view of a backlight module with two translucent faces according to a first embodiment of the present invention.
Figure 2:
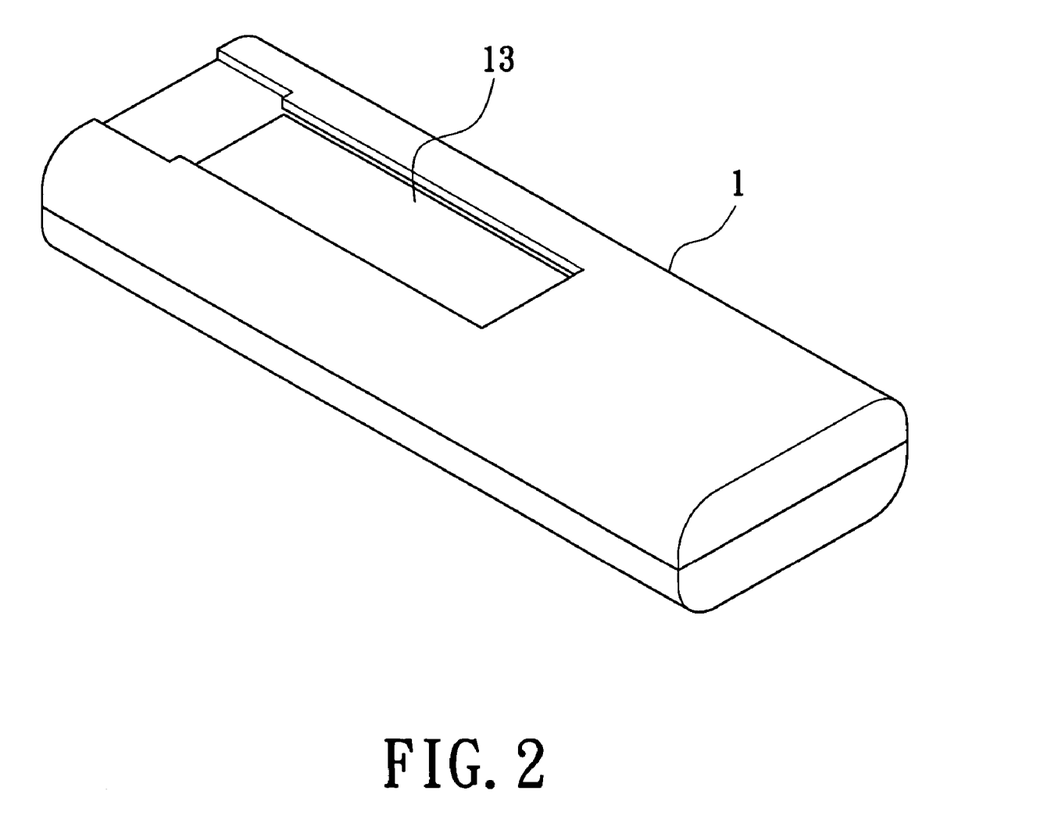
FIG. 2 is another perspective view of a backlight module with two translucent faces according to the first embodiment of the present invention.
Figure 3:
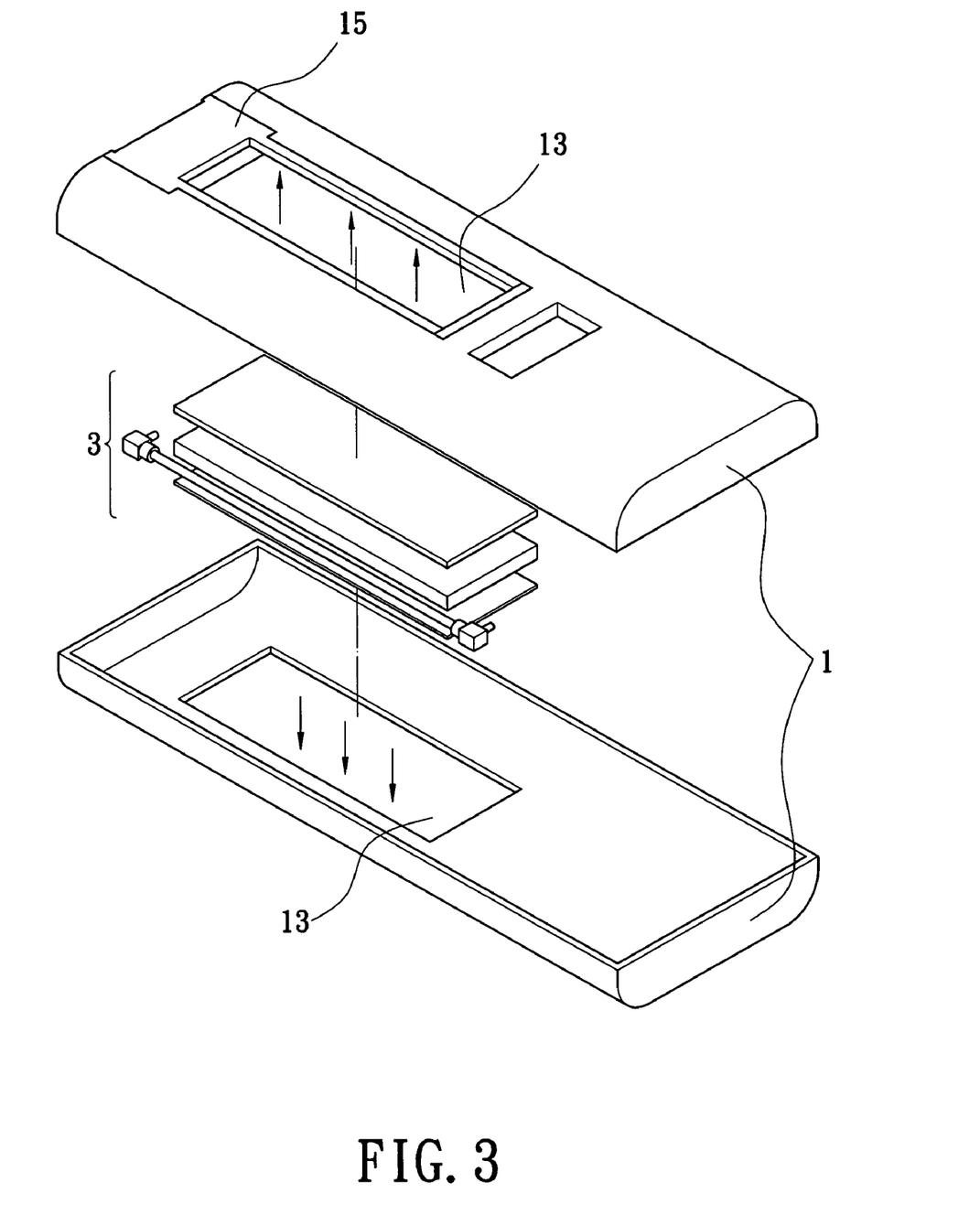
FIG. 3 is an exploded perspective view of a backlight module with two translucent faces according to the first embodiment of the present invention.

As shown in FIGS. 1 and 2, the present invention provides a backlight module with two translucent faces. The backlight module comprises a shell 1. A first translucent portion 11 and a second translucent portion 13 are disposed on upper and lower surfaces of the shell 1, respectively. The first and second translucent portions 11 and 13 are preferably transparent plates. Light can thus penetrate upper and lower faces of the backlight module. As shown in FIG. 3, a light source unit 3 in the backlight module provides illumination. Light generated by the light source unit 3 can penetrate the first and second translucent portions 11 and 13. A clamping component 15 is disposed outside the first translucent portion 11 for clamping a transparent document. For the backlight module of the present invention, the first translucent portion 11 can provide light for scanning a transparent document, and the second translucent portion 13 can provide light for previewing the transparent document.

Figure 4:
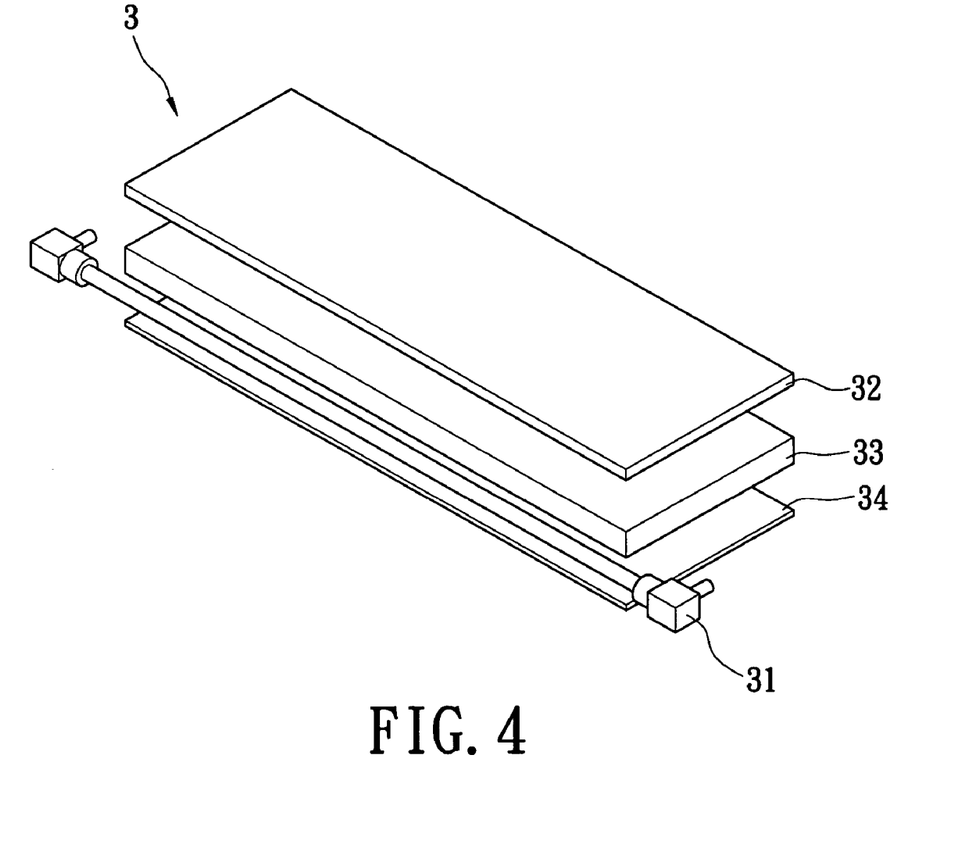
FIG. 4 is an exploded perspective view of a light source unit in a backlight module with two translucent faces according to the first embodiment of the present invention.

Because the backlight module of the present invention has a first translucent portion 11 and a second translucent portion 13 corresponding to each other, up and down, light of the light source unit 3 in the backlight module correspond to the first translucent portion 11 and the second translucent portion 13. As shown in FIG. 4, the light source unit 3 comprises a lamp tube 31, a light guide plate 33, a diffuser 32, and a transflective panel 34. The lamp tube 31 is arranged beside the light guide plate 33. The light guide plate 33 is mainly used to guide light generated by the lamp tube 31. The transflective panel 34 is arranged below the light guide plate 33, and can transmit and reflect the output light of the light guide plate 33. The diffuser 32 is arranged above the light guide plate 33, and is used to diffuse uniformly the output light of the light guide plate. The power supply and on-off control way of the lamp tube 31 is well known in this art and thus is not here described in further detail.

Reference is made to FIG. 4 again. When the light source unit 3 is located in the backlight module (as shown in FIG. 3), the diffuser 32 preferably corresponds to the first translucent portion 11, for the reason illustrated as follows. The output light of the diffuser 32 is a uniform light. The output light of the first translucent portion 11 is used for backlight illumination of the transparent document. Therefore, providing a uniform light for a transparent document can obtain a better image scanning quality. On the other hand, the transflective panel 34 corresponds to the second translucent portion 13. The transflective panel 34 provides two transmission ways for the output light of the light guide plate: one is to penetrate directly the transflective panel 34 and then output via the second translucent portion 13; the other is to be reflected to the first translucent portion 11 and then output. Light output from the first and second translucent portion 11 and 13 can thus be accomplished.

Figure 5:
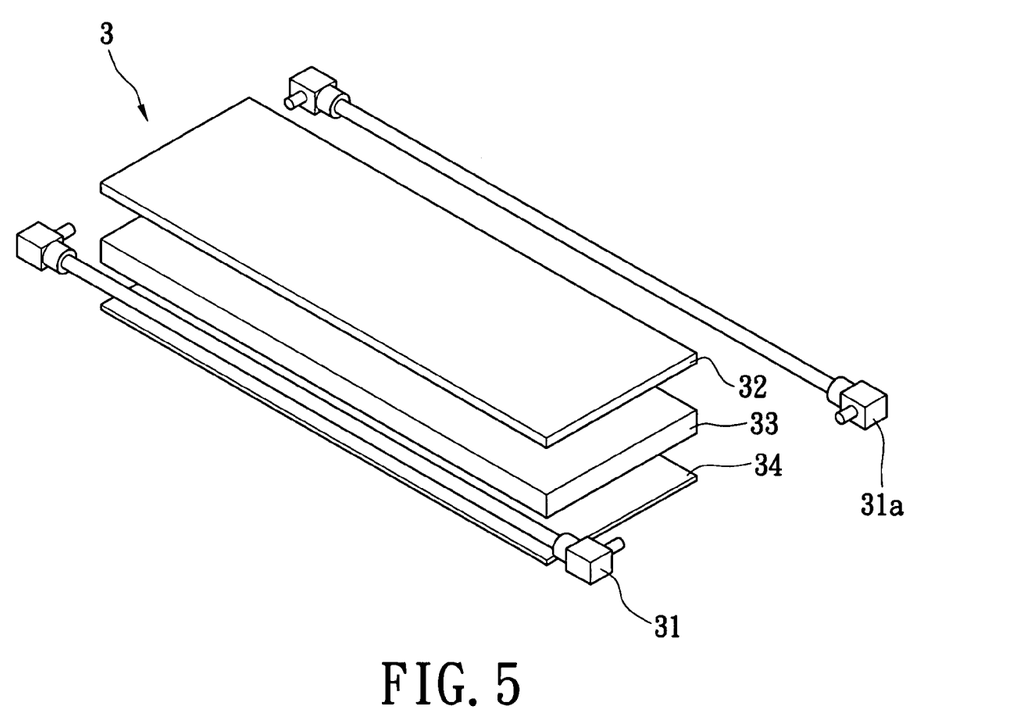
FIG. 5 is an exploded perspective view of a light source unit in a backlight module with two translucent faces according to a second embodiment of the present invention.

In order to increase the brightness of the output light, as shown in FIG. 5, a lamp tube 31a can be added at the other side of the light guide plate 33. In this way, the light source unit 3 provides better illumination so that improved image scanning quality can be obtained when scanning a transparent document and the transparent document can be viewed more clearly.

Figure 6:
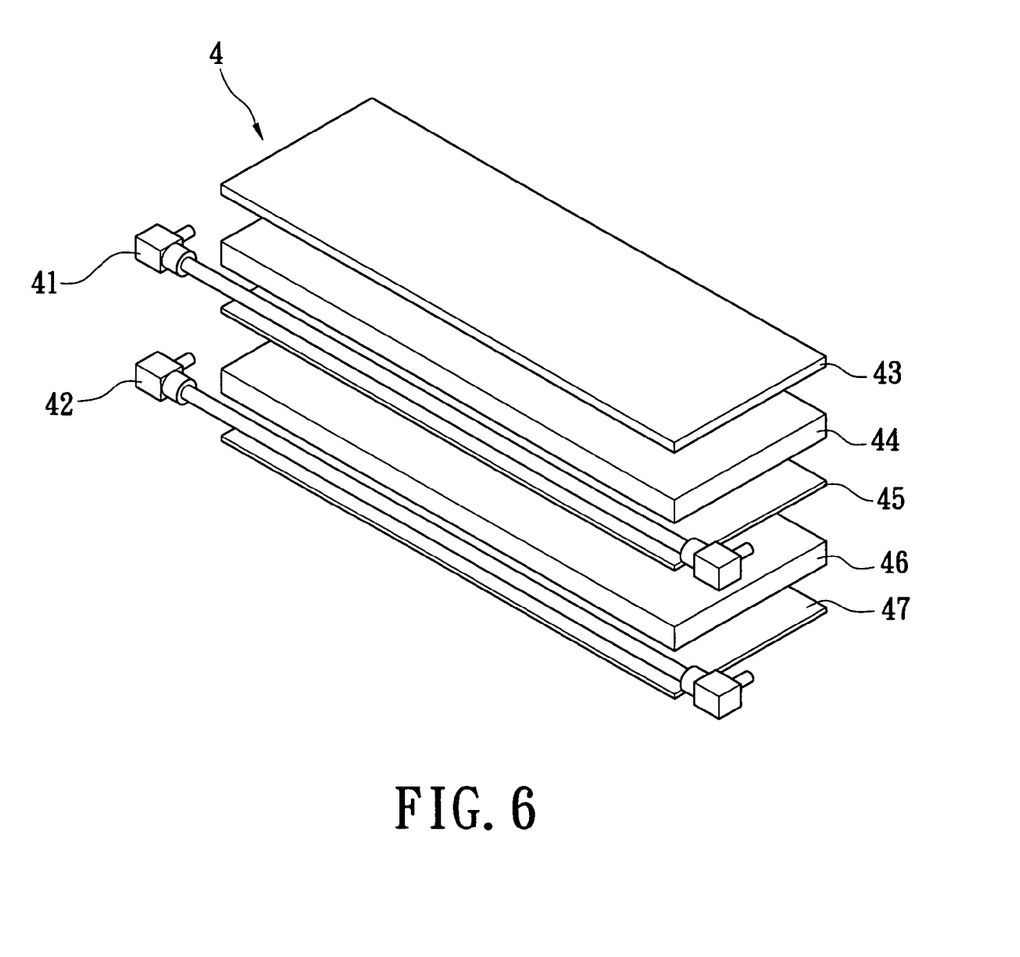
FIG. 6 is an exploded perspective view of a light source unit in a backlight module with two translucent faces according to a third embodiment of the present invention.

As shown in FIG. 6, a light source unit 4 comprises a first lamp tube 41, a second lamp tube 42, a first light guide plate 44, a second light guide plate 46, a first diffuser 43, a second diffuser 47, and a reflecting plate 45. The reflecting plate 45 is arranged between the first and second light guide plates 44 and 46. The first diffuser 43 is arranged above the first light guide plate 44. The second diffuser 47 is arranged below the second light guide plate 48. The first and second lamp tubes 41 and 42 are arranged beside the first and second light guide plates 44 and 46, respectively.

Reference is made to FIG. 6 again. The output lights of the first and second light guide plates 44 and 46 can be reflected by the reflecting plate 45 and then output via the first and second diffusers 43 and 47, respectively. Therefore, by means of reflection provided by the reflecting plate 45, light of the first lamp tube 41 will be output via the first diffuser 43, while light of the second lamp tube 43 will be output via the second diffuser 47. When the light source unit 4 is used in a backlight module, the first diffuser 43 and the second diffuser 47 correspond to the first translucent portion 11 and the second translucent portion 13, respectively. Light from the first lamp tube 41 and the second lamp tube 43 can thus be output via the first translucent portion 11 and the second translucent portion 13, respectively.

As stated above, the backlight module of the present invention can simultaneously emit light via the first and second translucent portions 11 and 13 to provide illumination. Because the clamping component 15 for clamping a transparent document is disposed outside the first translucent portion 11, when the transparent document is clamped by the clamping component 15, a user can directly view the image content of the transparent document from the opposite side of the first translucent portion 11 (i.e., the second translucent portion 13) before scanning so as to determine whether to scan the transparent document or not. How the backlight module is combined with the scanner for scanning the transparent document is well known in this art and thus is not described here in further detail.

Figure 7A:
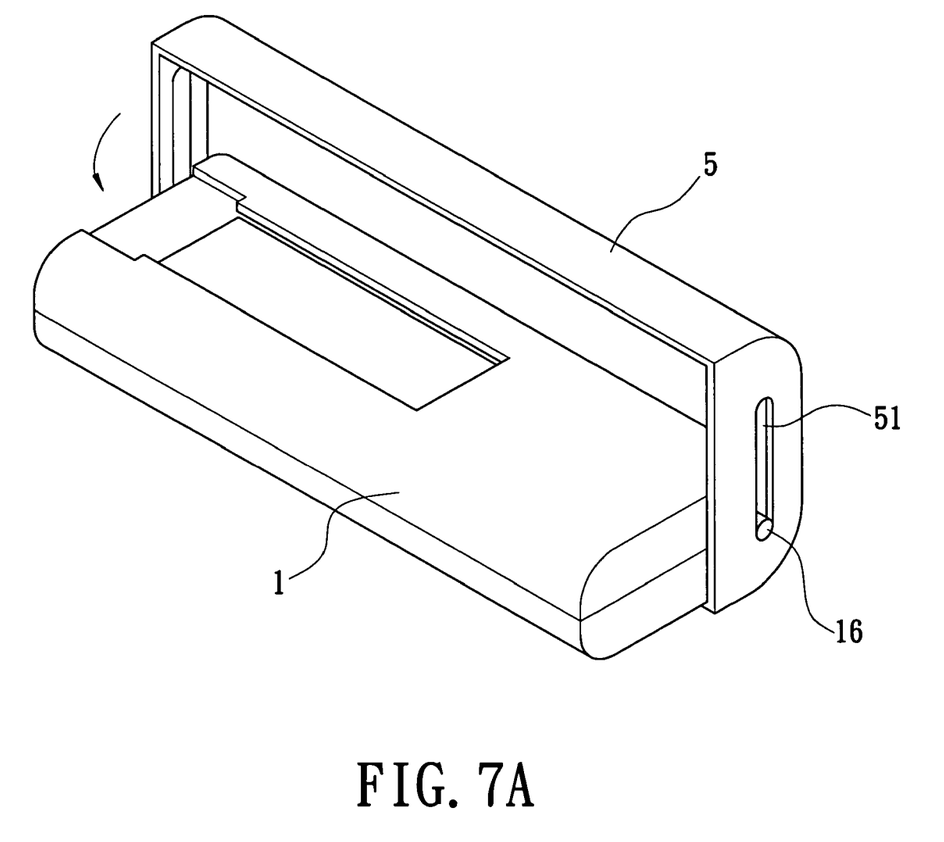
FIG. 7A is a perspective view of a backlight module with two translucent faces combined with an opened cover body according to a fourth embodiment of the present invention.
Figure 7B:
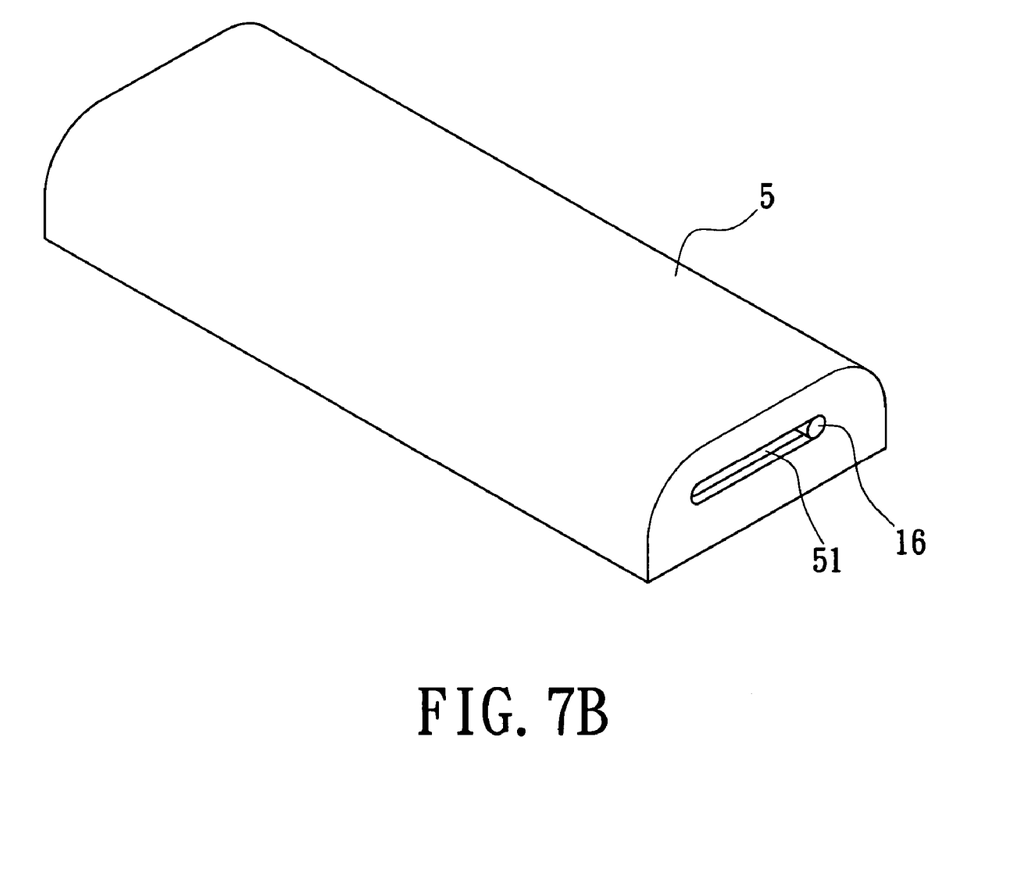
FIG. 7B is a perspective view of a backlight module with two translucent faces combined with a closed cover body according to the fourth embodiment of the present invention.

As shown in FIGS. 7A and 7B, the backlight module can be combined with a cover body 5 for storage. Guide pieces 16 are disposed at two sides of the shell 1 of the backlight module. Guide grooves 51 are disposed at two sides on the cover body 5 corresponding to the backlight module. The guide pieces 16 of the shell 1 of the backlight module can be movably and pivotally disposed in the guide grooves 51 of the cover body 5. As shown in FIG. 7A, the cover body 5 can be opened with the guide pieces 16 as the pivot after the cover body 5 and the shell 1 of the backlight module are combined together. As shown in FIG. 7B, the cover body 5 can also be closed to store up the backlight module.

Figure 8A:
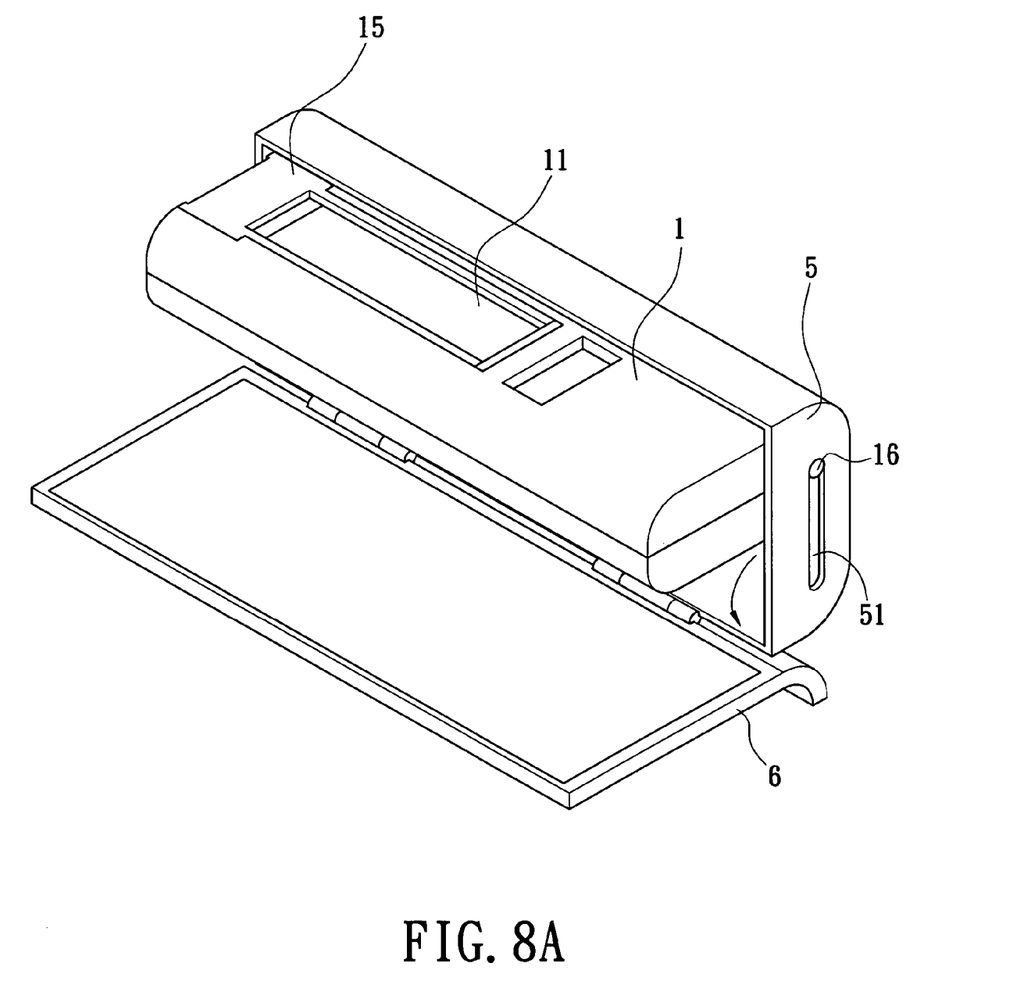
FIG. 8A is a perspective view of a backlight module with two translucent faces combined with a cover body and a chassis according to a fifth embodiment of the present invention.
Figure 8B:
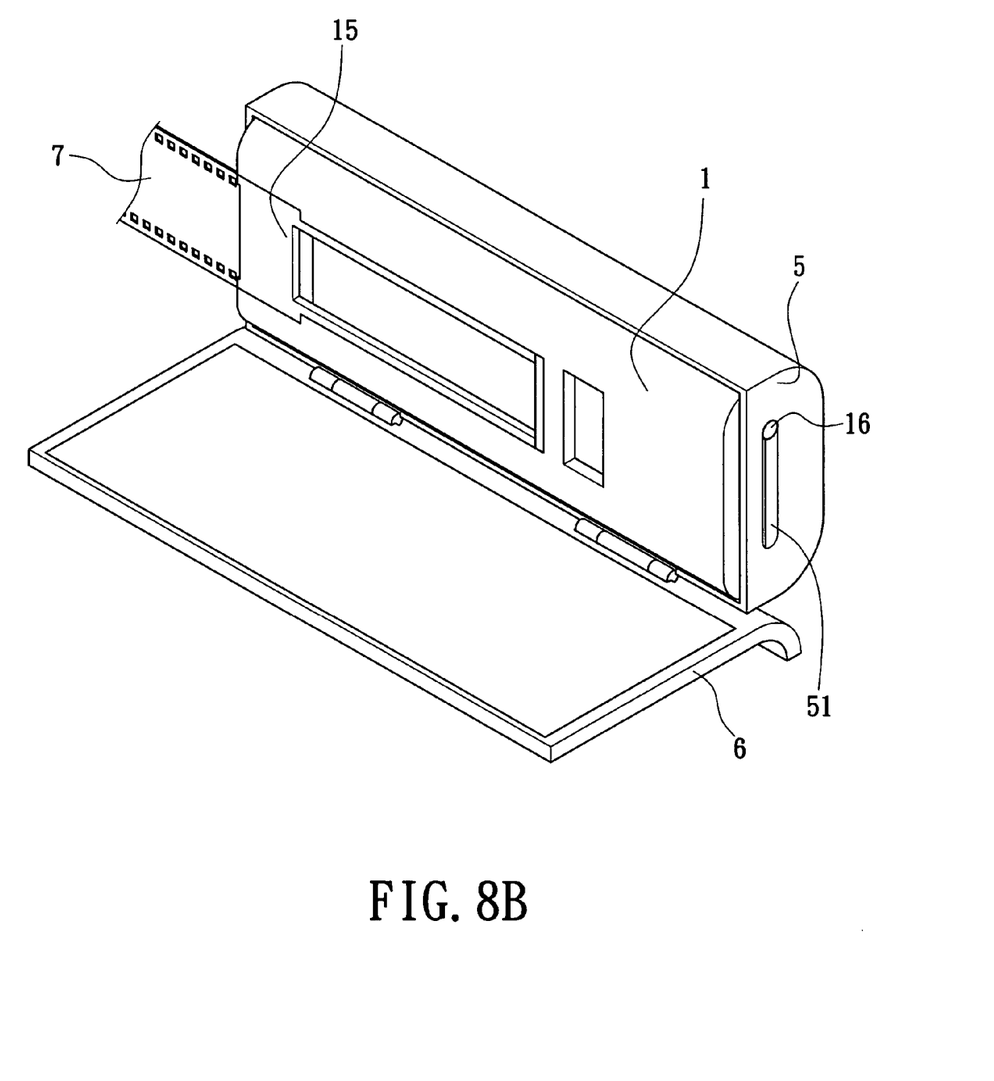
FIG. 8B is a perspective view of a backlight module with two translucent faces combined with a cover body and a chassis according to the fifth embodiment of the present invention, wherein a negative is being input.

As shown in FIGS. 8A and 8B, the cover body 5 can further be pivotally connected with a chassis 6, which can provide tighter closure when the backlight module is stored in the cover body 5. As shown in FIG. 8A, a negative 7 clamped by the clamping component 5 is input. Because the chassis 6 is a hollow frame, scanning of the negative can still be performed when the backlight module is stored in the cover body 5.

Figure 9A:
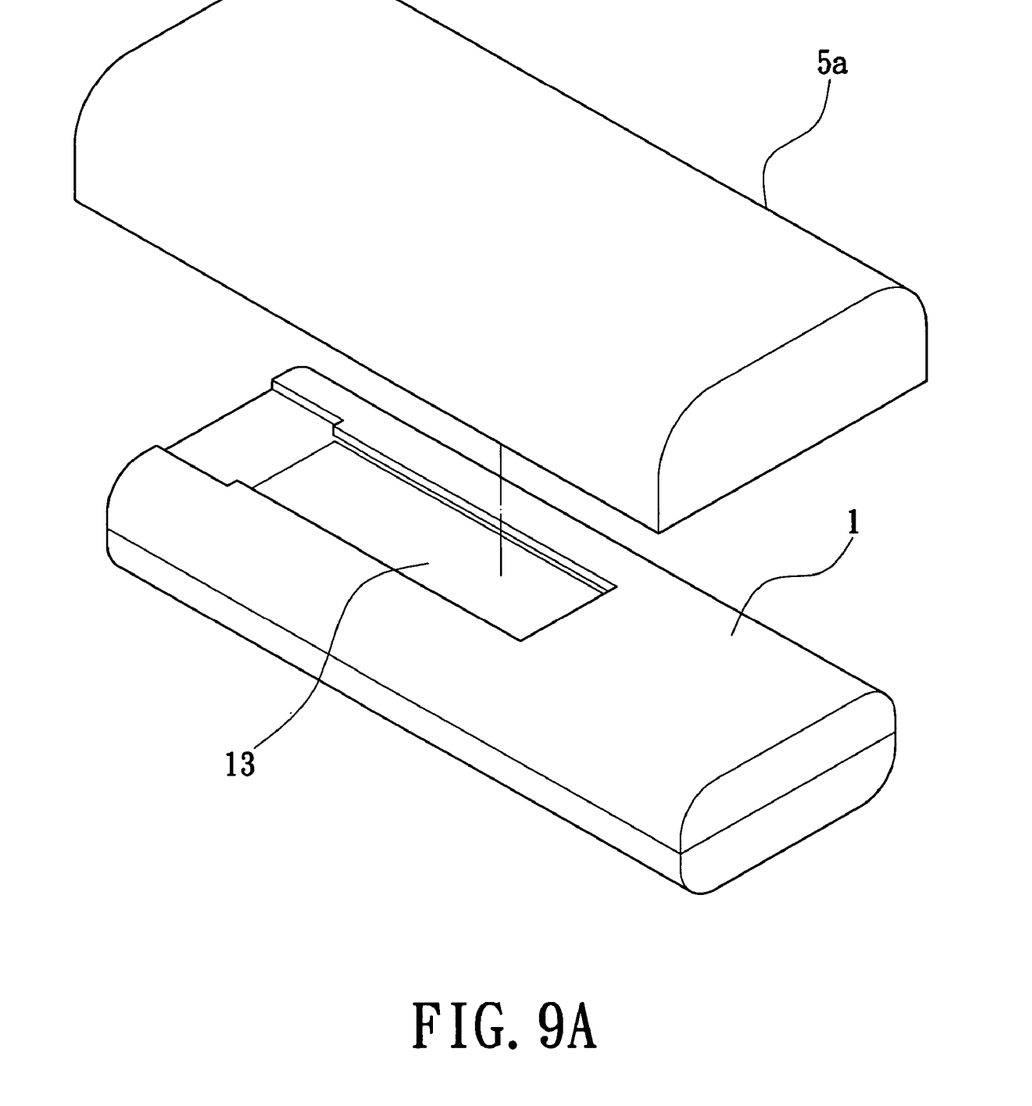
FIG. 9A is a perspective view of a backlight module with two translucent faces combined with an opened cover body according to a sixth embodiment of the present invention.
Figure 9B:
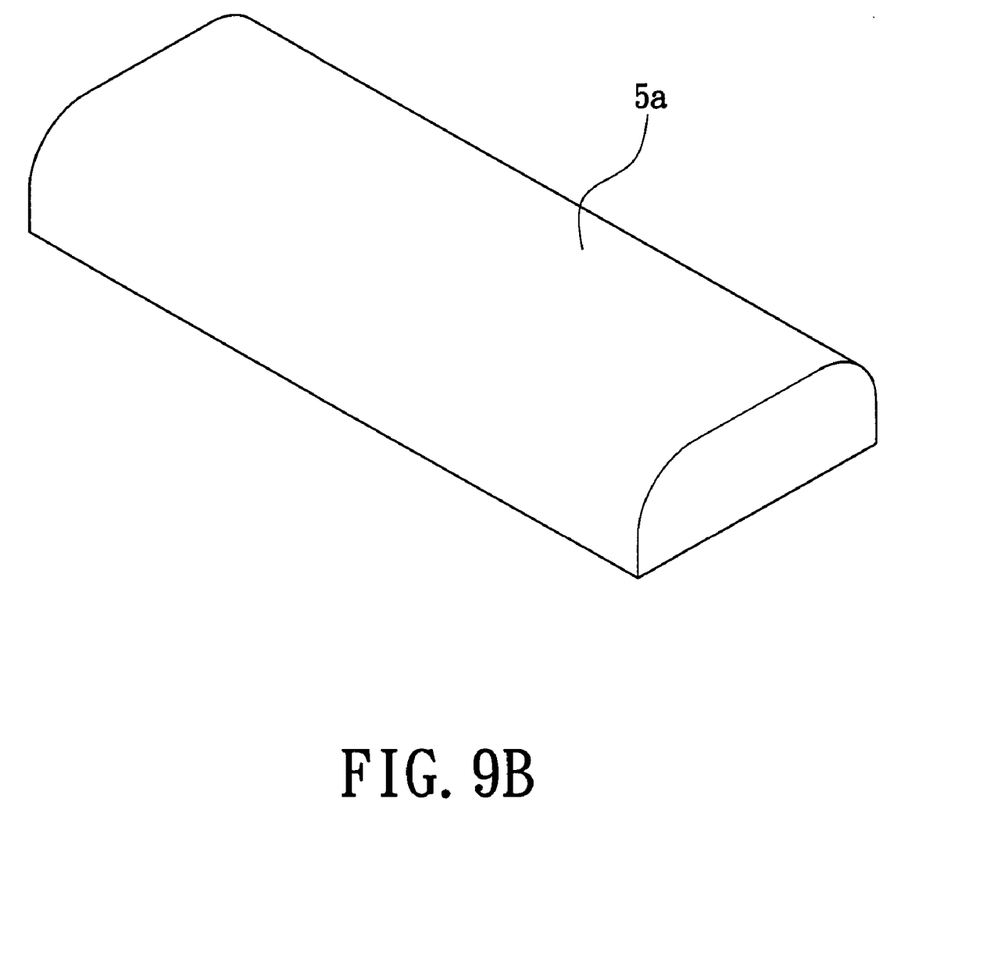
FIG. 9B is a perspective view of a backlight module with two translucent faces combined with a closed cover body according to the sixth embodiment of the present invention.

As shown in FIGS. 9A and 9B, the mouth of a cover body 5a faces downwards. The cover body 5a downwardly covers the second translucent portion 13 of the shell 1. Of course, the cover body 5a can also cover the first translucent portion 11 of the shell 1 to accomplish the effect of storing the backlight module.

Figure 10A:
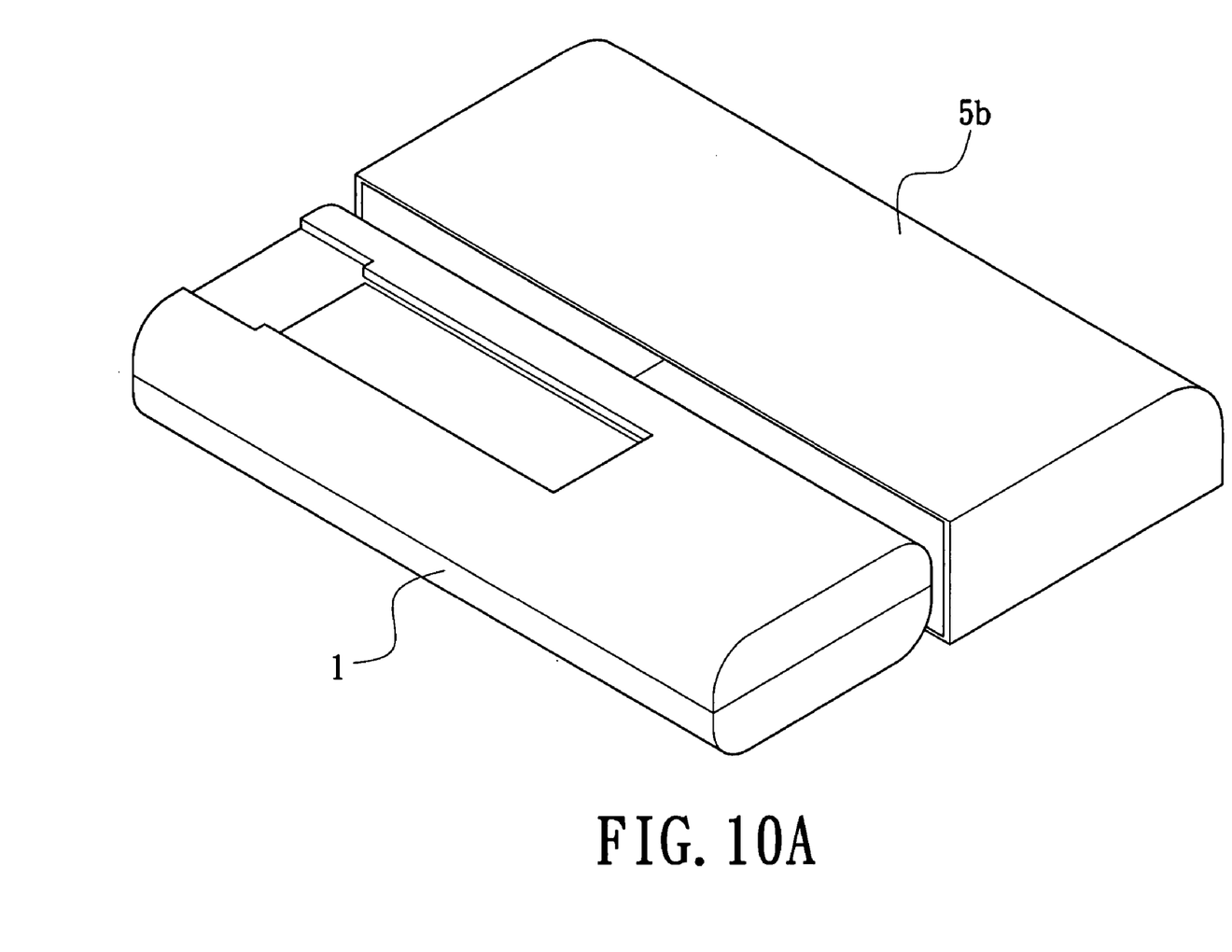
FIG. 10A is a perspective view of a backlight module with two translucent faces combined with an opened cover body according to a seventh embodiment of the present invention.
Figure 10B:
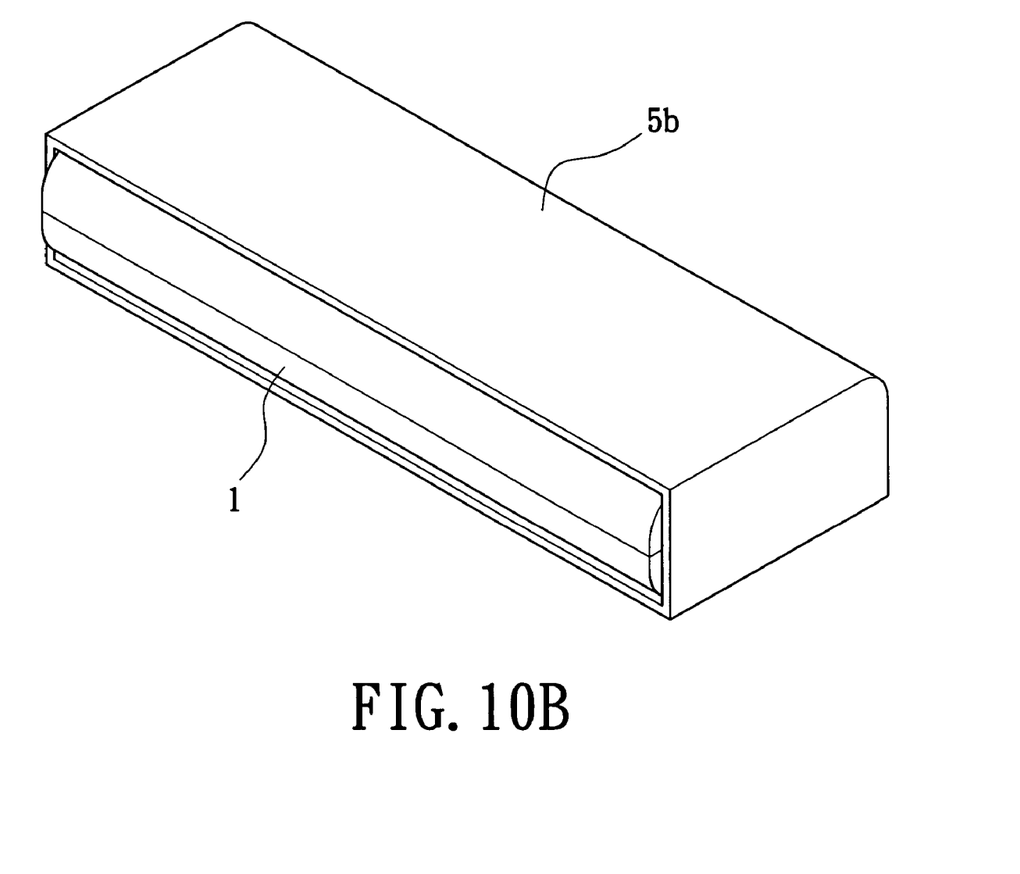
FIG. 10B is a perspective view of a backlight module with two translucent faces combined with a closed cover body according to the seventh embodiment of the present invention.

As shown in FIGS. 10A and 10B, the mouth of a cover body 5b faces sideward. The cover body 5b covers the side of the shell 1 to accomplish the effect of storing the backlight module.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A backlight module with two translucent faces applicable to a scanner for scanning a transparent document, said backlight module comprising:
    a shell having a first translucent portion and a second translucent portion;
    a light source unit disposed in said shell, said light source unit comprising at least a lamp tube and a light guide plate, said light guide plate being used for uniformly guiding light of said lamp tube to penetrate said first and second translucent portions; and
    a cover body for accommodating said shell, said cover body having guide grooves formed therein and guide pieces for sliding in said guide grooves, said cover body further including a chassis movably and pivotally disposed thereon.

2. The backlight module with two translucent faces as claimed in claim 1, wherein said first and second translucent portions are correspondingly disposed up and down on said shell.

3. The backlight module with two translucent faces as claimed in claim 1, wherein said first and second translucent portions are transparent plates.

4. The backlight module with two translucent faces as claimed in claim 1, wherein said lamp tube is arranged beside said light guide plate.

5. The backlight module with two translucent faces as claimed in claim 1, wherein said light source unit further comprises a diffuser arranged above said light guide plate and used to diffuse uniformly output light of said light guide plate.

6. The backlight module with two translucent faces as claimed in claim 1, wherein said light source unit further comprises a transflective panel arranged below said light guide plate, and said transflective panel is used to reflect output light of said light guide plate to said first translucent portion and transmit output light of said light guide plate to said second translucent portion.

7. The backlight module with two translucent faces as claimed in claim 1 further comprising a clamping component disposed outside said first translucent portion and used for clamping said transparent document.

8. The backlight module with two translucent faces as claimed in claim 1, wherein a mouth of said cover body faces downwards or sideward.

9. The backlight module with two translucent faces as claimed in claim 1, wherein said transparent document is a slide or a negative.

10. A backlight module with two translucent faces applicable to a scanner for scanning a transparent document, said backlight module comprising:
    a shell having a first translucent portion and a second translucent portion on opposing sides thereof; and
    a light source unit disposed in said shell, said light source unit comprising:
    a first lamp tube;
    a first light guide plate used for uniformly guiding light of said first lamp tube to penetrate said first translucent portion;
    a second lamp tube;
    a second light guide plate used for uniformly guiding light of said second lamp tube to penetrate said second translucent portion;
    a reflecting plate arranged between said first and second light guide plates and being reflective on opposing sides thereof to reflect output light of said first light guide plate to said first translucent portion and reflect output light of said second light guide plate to said second translucent portion.

11. The backlight module with two translucent faces as claimed in claim 10, wherein said first and second translucent portions are correspondingly disposed up and down on said shell.

12. The backlight module with two translucent faces as claimed in claim 10, wherein said first and second translucent portions are transparent plates.

13. The backlight module with two translucent faces as claimed in claim 10, wherein said first and second lamp tubes are arranged beside said first and second light guide plates, respectively.

14. The backlight module with two translucent faces as claimed in claim 10, wherein said light source unit further comprises a first diffuser arranged above said first light guide plate and used to diffuse uniformly output light of said first light guide plate.

15. The backlight module with two translucent faces as claimed in claim 10, wherein said light source unit further comprises a second diffuser arranged above said second light guide plate and used to diffuse uniformly output light of said second light guide plate.

16. The backlight module with two translucent faces as claimed in claim 10, further comprising a clamping component disposed outside said first translucent portion and used for clamping said transparent document.

17. The backlight module with two translucent faces as claimed in claim 10 further comprising a cover body for accommodate said shell.

18. The backlight module with two translucent faces as claimed in claim 17, wherein said cover body has guide grooves, and said shell has guide pieces for sliding in said guide grooves.

19. The backlight module with two translucent faces as claimed in claim 18, wherein said cover body further comprises a chassis movably and pivotally disposed thereon.

20. The backlight module with two translucent faces as claimed in claim 17, wherein a mouth of said cover body faces downwards or sideward.

21. The backlight module with two translucent faces as claimed in claim 10, wherein said transparent document is a slide or a negative.

* * * * *